(12) United States Patent
Miyajima

(10) Patent No.: US 6,837,525 B2
(45) Date of Patent: Jan. 4, 2005

(54) TUBE CONNECTING STRUCTURE

(75) Inventor: Atsuo Miyajima, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/418,573

(22) Filed: Apr. 17, 2003

(65) Prior Publication Data
US 2003/0197374 A1 Oct. 23, 2003

(30) Foreign Application Priority Data
Apr. 19, 2002 (JP) ........................................ 2002-117536

(51) Int. Cl.[7] .............................................. F16L 39/00
(52) U.S. Cl. ...................... 285/319; 285/331; 285/903; 285/921
(58) Field of Search ................................ 285/319, 233, 285/305, 307, 308, 313, 334.5, 331, 903, 921

(56) References Cited

U.S. PATENT DOCUMENTS

| | | | | |
|---|---|---|---|---|
| 2,113,211 A | * | 4/1938 | Lake | 285/334.5 |
| 5,042,844 A | * | 8/1991 | Iida et al. | 285/319 |
| 5,275,443 A | * | 1/1994 | Klinger | 285/305 |
| 5,607,190 A | * | 3/1997 | Exandier et al. | 285/308 |
| 6,102,448 A | * | 8/2000 | Fixemer et al. | 285/921 |
| 6,106,028 A | * | 8/2000 | Godeau et al. | 285/319 |
| 6,199,919 B1 | | 3/2001 | Kawasaki et al. | |
| 6,428,055 B1 | * | 8/2002 | Moretti et al. | 285/319 |
| 6,481,759 B1 | | 11/2002 | Kawasaki et al. | |
| 6,517,120 B1 | | 2/2003 | Miyajima et al. | |
| 2002/0145283 A1 | | 10/2002 | Miyajima et al. | |
| 2004/0119284 A1 | * | 6/2004 | Van Der Meijden et al. | 285/319 |

* cited by examiner

Primary Examiner—Eric K. Nicholson
Assistant Examiner—Aaron Dunwoody
(74) Attorney, Agent, or Firm—Darby & Darby

(57) ABSTRACT

A tube connecting structure is formed with first and second cylindrical sections. The first cylindrical section includes: a joining cylinder with engagement holes disposed at a first end; a ring-shaped flange projecting radially inward from a second end; an inner cylinder extending co-axially toward the first end; and an inner cylindrical member separated axially from the inner cylinder. An O-ring is disposed co-axially between the inner cylinder and inner cylindrical member. Large and small diameter sections of the joining member align with a large-diameter section and small-diameter cylindrical section of the first tube, respectively, and are fitted into the space between the joining cylinder and the inner cylinder and inner cylindrical member. A second tube supported within the second cylindrical section is prevented from slipping out. The O-ring provides a fluid-tight seal between the first and second tubes.

8 Claims, 11 Drawing Sheets

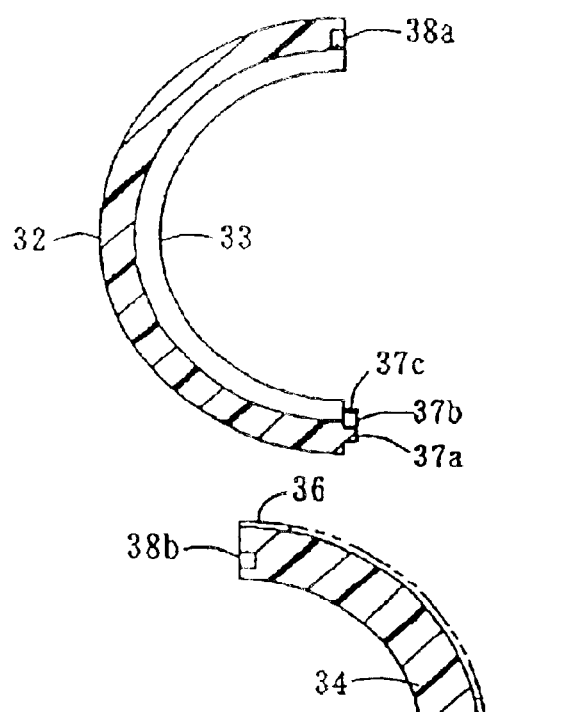
FIG. 15A
FIG. 15B
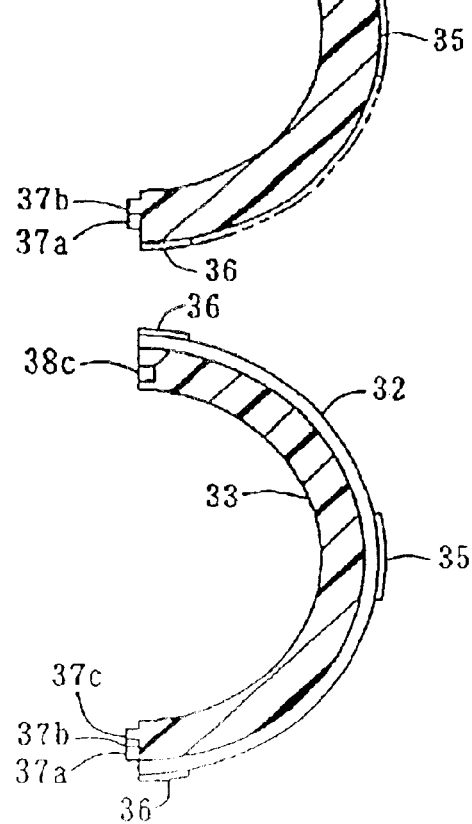
FIG. 15C

TUBE CONNECTING STRUCTURE

BACKGROUND OF THE INVENTION

The present invention relates to a tube connecting structure that connects a first tube and a second tube with a connecting member and uses a sealing member to form a fluid-tight seal between an end of the first tube and an end of the second tube.

U.S. Pat. No. 6,481,759 presents an example of a conventional tube connecting structure (see FIG. 17). In this tube connecting structure, a main bushing unit 3a of press-in bushing means 3 is pressed into a resin tube 1. The resin tube 1 has a flared end 1a having a large diameter. A joining member 2 is fitted to the outer perimeter of a shoulder 1b of the resin tube 1. Also, a ring-shaped sealing member 4 is mounted in a ring-shaped groove formed by: the outer surface of the flared end 1a of the resin tube 1; a ring-shaped stopper surface means 3b of the press-in bushing means 3; and a cylindrical base section 2a of the joining member 2. An insertion end 5a of a tube-shaped opposing member 5 is relatively fitted to the outer perimeter surfaces of stopper surface means 3b of press-in bushing means 3 and the base section 2a of the joining member 2. A second engagement section 5b engages with a first engagement section 2b of the joining member 2. As a result, the sealing member 4 provides a fluid-tight seal between the insertion end 5a and the flared end 1a.

However, in this conventional tube connecting structure, a chuck tool must be used to compress the tube while pressing the press-in bushing means into the resin tube. At the same time, the chuck tool must avoid contact with the joining member. The position of the joining member must therefore be moved inward along the axis of the resin tube to allow sufficient room for the chuck tool. Consequently, the flared end of the resin tube requires a straight section having a length that includes both the length of the joining member and the length of the chuck tool. When a flexible accordion tube is to be used with this conventional tube connecting structure, a very long straight section is needed at the end of the resin tube. In this situation, installation of a tube connecting structure with an accordion tube in a small space (e.g., in an automobile) can be extremely difficult due to space restrictions because this tube connecting structure requires a long, non-deformable straight section. Also, in the case of this conventional tube connecting structure, the press-in member is prevented from slipping out due to tension on the resin tube. If the tension on the resin tube decreases, however, the press-in member can slip out, allowing the opposing member and sealing member to slip out as well. Thus, the sealing properties of the tube connecting structure can be compromised.

OBJECTS AND SUMMARY OF THE INVENTION

The objective of the present invention is to overcome the problems described above and to provide a tube connecting structure that: allows the straight section at the end of the tube to be short; prevents the tube and the sealing member from slipping out even if the tension on the tube is reduced; and maintains the sealing properties of the tube connection.

In order to achieve the objectives described above, the invention provides a tube connecting structure wherein a cylindrical connecting member is formed integrally from a first cylindrical section disposed at a first axial end and a second cylindrical section co-axially disposed at a second axial end. A first tube is connected to the first cylindrical section and a second tube is connected to the second cylindrical section.

The first cylindrical section includes: a joining cylinder formed with engagement holes at a first end at a plurality of perimeter positions; a ring-shaped flange projected radially inward from the second end of the joining cylinder; an inner cylinder extending within the joining cylinder co-axially from the ring-shaped flange toward the first end of the joining cylinder and separated by a predetermined distance from the first end of the joining cylinder; and an inner cylindrical member having a diameter identical to that of the inner cylinder and extending co-axially within the joining cylinder at a predetermined axial distance from a first end of the inner cylinder, one end of the inner cylindrical member being projected outward from the joining cylinder. An elastic ring-shaped sealing member is disposed co-axially between the inner cylinder and the inner cylindrical member.

The first tube includes: a large-diameter end having an inner diameter roughly identical to an outer diameter of each of the inner cylinder and the inner cylindrical member; and a small-diameter cylindrical section adjacent to the large-diameter end, having a diameter smaller than that of the large-diameter end.

A joining member is disposed wherein the joining member is formed as a cylindrical shape by combining a pair of half-cylindrical members in which a second axial side is formed as a large-diameter section and a first axial side is formed as a small-diameter section. Engagement pieces are formed on the large-diameter section each half-cylindrical member at positions aligned with the engagement holes on the joining cylinder. The engagement pieces are projected radially outward and are elastically deformable in a radial direction. The joining member supports the first tube by fitting the large-diameter end of the joining member to the large-diameter section of the first tube and fitting the small-diameter section of the joining member to the small-diameter cylindrical section of the first tube. The joining member is inserted and fitted integrally with the first tube into a space formed between the joining cylindrical structure, the inner cylinder, and the inner cylindrical member. The engagement pieces of the large-diameter section of the half-cylindrical member engage with the engagement holes of the first cylindrical section so that the first tube is connected to the first cylindrical section.

The second tube includes an insertion end extending in a straight manner and formed with a ring-shaped projection projecting radially outward at a predetermined distance from an end. The second tube is inserted into the second cylindrical section such that the ring-shaped projection engages with an engaging means formed integrally or separately from the second cylindrical section, thus preventing slippage. An end of the insertion end extends to the inner cylindrical member in the first cylindrical section. An inner perimeter surface of the large-diameter end of the first tube and an outer perimeter surface of an insertion end of the second tube are sealed in a fluid-tight manner by the elastic ring-shaped sealing member.

In the present invention, the first tube is formed from a large-diameter end spanning axially from one end to a predetermined distance, with an inner diameter roughly identical to an outer diameter of the inner cylinder and the inner cylindrical member. The first tube also has a small-diameter cylindrical section adjacent to the large-diameter end. The large-diameter sections of the pair of half-cylindrical members of the joining member are aligned with the large diameter end of the first tube. The small-diameter sections of the pair of half-cylindrical members of the joining member are aligned with the small-diameter cylindrical section of the first tube. The joining member is thereby fitted to the first tube and provides support to the first tube. The joining member is fitted and inserted, integrally with the first tube, into a space formed by the joining cylinder of the first cylindrical section, and the inner cylinder and inner cylindrical member of the first cylindrical section. Engagement pieces of the large-diameter section engage with the engagement holes of the joining cylinder so that the first tube is joined with the first cylindrical section. In this manner, the joining member supports the first tube so that the first tube is connected with the first cylindrical section, and the joining member also serves as a chuck when the first tube is inserted and fitted to the first cylindrical section. Thus, there is no need to provide a separate straight section at the end of the first tube for chucking. As a result, the length of the straight section at the end of the first tube can be reduced.

A shelf is formed between the large-diameter end and the small-diameter cylindrical section of the first tube. This shelf engages tightly against a shelf formed between the large-diameter section and the small-diameter section of the joining member. As a result, the first tube is reliably prevented from slipping out of the first cylindrical section without relying on tension to the inner cylinder and inner cylindrical member. Furthermore, the inner cylindrical member is prevented from moving axially outward because of the shelves of the joining member the first tube. Because the inner cylindrical member is prevented from moving axially outward, the elastic ring-shaped sealing member, which is supported between the inner cylinder and inner cylindrical member, is reliably prevented from slipping out of the first cylindrical section.

Also, the large-diameter end of the first tube is inserted and fitted into the first cylindrical section, and the end of the insertion end of the second tube is extended to the inner cylindrical member of the first cylindrical section. Thus, the large-diameter end and the insertion end compress and support the elastic ring-shaped scaling member. This allows the elastic ring-shaped sealing member to provide a seal between the first tube and the second tube.

BRIEF DESCRIPTION OF THE DRAWINGS

FIG. 15A is a cross-section drawing along the A—A line of FIG. 13 showing the half-cylindrical member.

FIG. 15B is a cross-section drawing along the B—B line of FIG. 13 showing the half-cylindrical member.

FIG. 15C is a cross-section drawing along the C—C line of FIG. 13 showing the half-cylindrical member.

Figure 1:
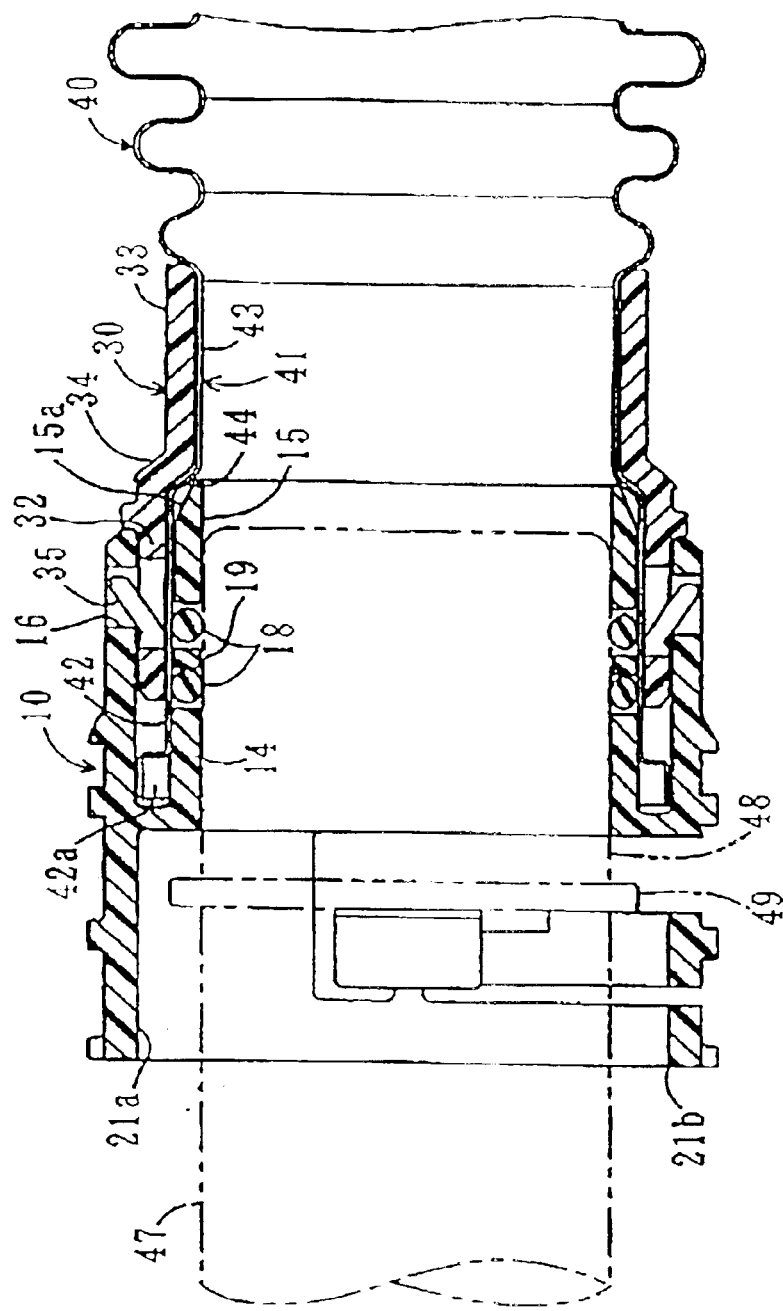
FIG. 1 is a front-view cross-section drawing showing the tube connecting structure according to the present invention.
Figure 2:
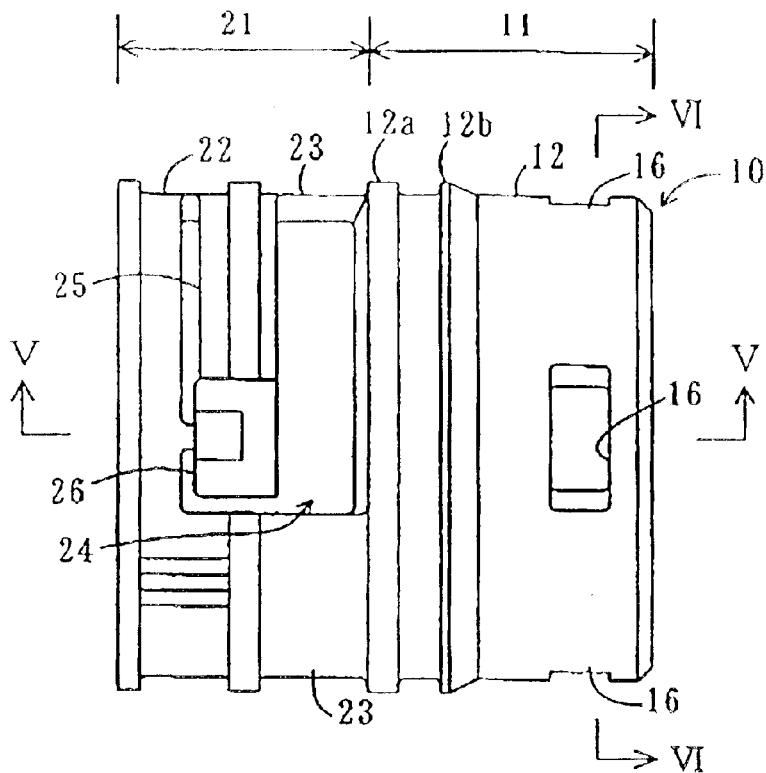
FIG. 2 is a front-view drawing showing the connecting member of the tube connecting structure.
Figure 3:
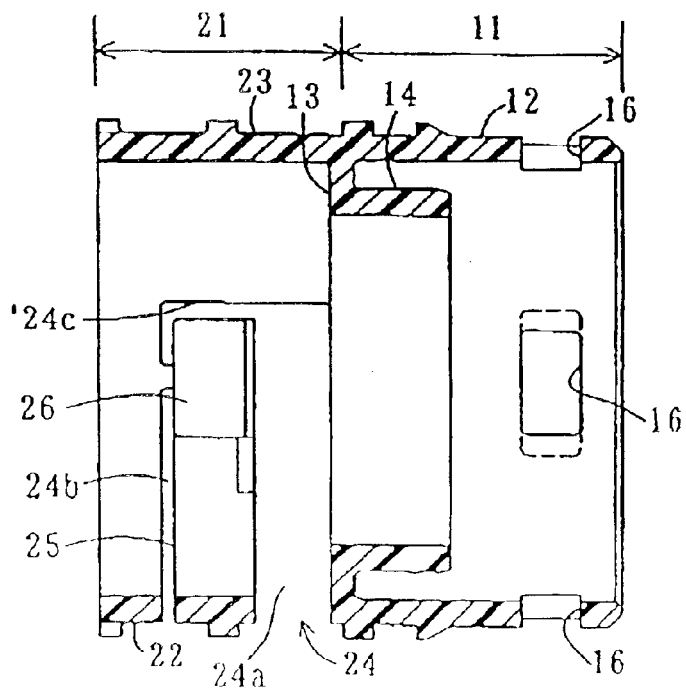
FIG. 3 is a cross-section drawing along the III—III line from FIG. 4 showing the connecting member.
Figure 4:
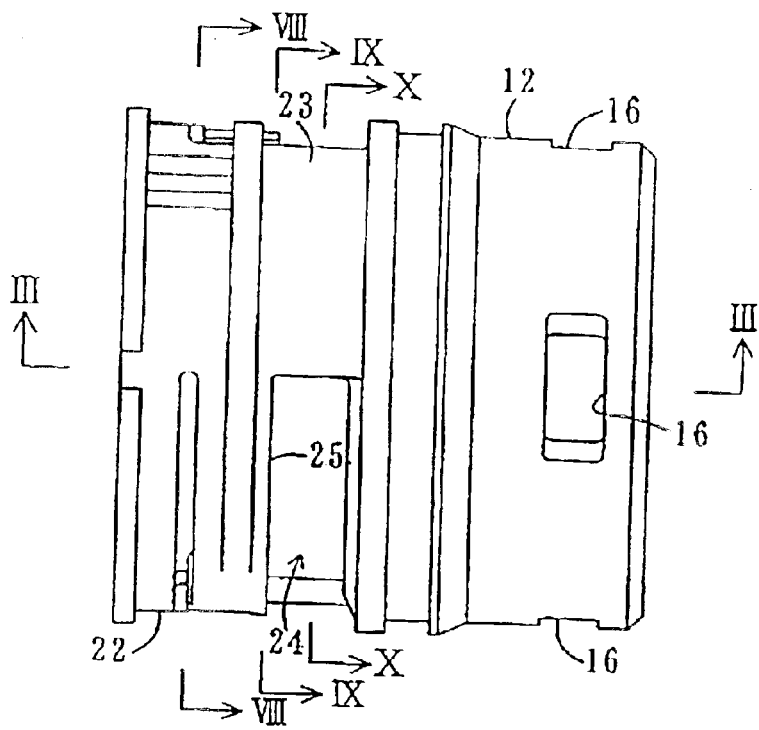
FIG. 4 is a plan drawing showing the connecting member.

LIST OF REFERENCE NUMERALS 10 connecting member; 11 first cylindrical section; 12 joining cylinder; 12a rib; 12b rib; 13 ring-shaped flange; 14 inner cylinder; 15 inner cylindrical member; 15a sloped end; 16 engagement hole; 18 O-ring; 19 elastic ring-shaped sealing member; 21 second cylindrical section; 21a axial hole; 21b open end; 22 open cylindrical section; 23 joining section; 24 slit; 24a first slit; 24b second slit; 24c third slit; 25 engagement piece; 26 engagement projection; 26a inner surface; 30 joining member; 31 half-cylindrical member; 32 large-diameter section; 32a ring-shaped rib; 33 small-diameter section; 33a ring-shaped rib; 34 shelf; 35 engagement piece; 35a "C"-shaped groove; 36 half-engagement piece; 36a right angle groove; 37a engagement projection; 37b engagement projection; 37c engagement projection; 38a engagement cavity; 38b engagement cavity; 38c engagement cavity; 40 first tube; 41 insertion end; 42 large-diameter end; 42a bent end; 43 small-diameter cylindrical section; 44 shelf; 45 accordion section; 47 second tube; 48 insertion end; 49 ring-shaped projection.

DETAILED DESCRIPTION OF THE PREFERRED EMBODIMENTS

The present invention is described with references to the drawings. FIG. 1 is a front-view cross-section drawing of a tube connecting structure according to the present invention. FIGS. 2 through 10 show simplified views of the connecting member portion of the tube connecting structure. The tube connecting structure includes: a roughly cylindrical connecting member 10 extending axially straight from a first end to a second end; a first tube 40 formed as a resin accordion tube inserted and fitted from the open end at the first end of the connecting member 10; a joining member 30 engaging the first tube 40 to the first end of the connecting member 10; a second tube 47 inserted and fitted into the open end at the second end of the connecting member 10; and an elastic ring-shaped sealing member 19 inserted and fitted into the connecting member 10 and serving to seal a space between the inner perimeter surface of the first tube 40 and the outer perimeter surface of the second tube 47. With regard to the first and second ends of the connecting member 10, the first end is shown as the rightward end in FIG. 1 (i.e., the end of the connecting member 10 into which the first tube 40 is inserted). The second end is shown as the leftward end in FIG. 1 (i.e., the end of the connecting member 10 into which the second tube 47 is inserted).

Figure 16:
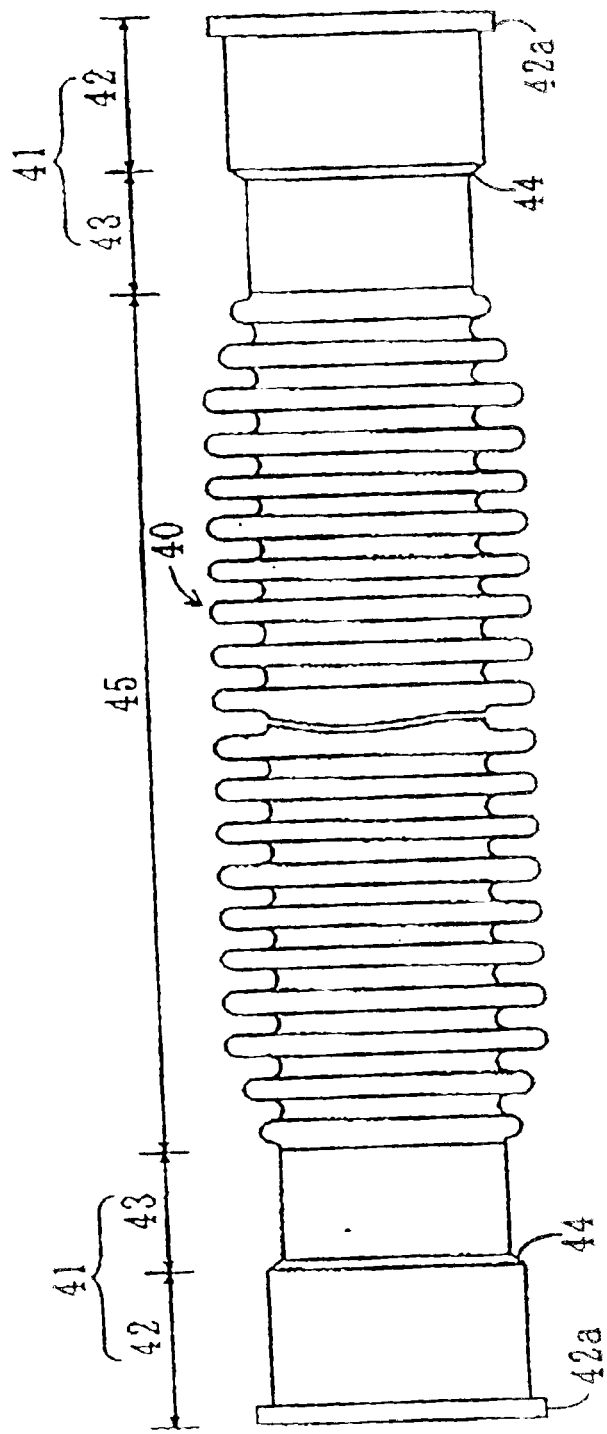
FIG. 16 is a front-view drawing showing an accordion tube.
Figure 17:
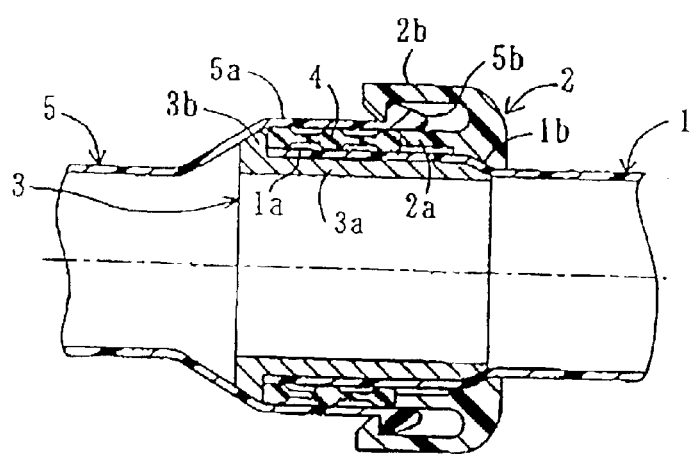
FIG. 17 is a front-view cross-section drawing of a conventional tube connecting structure found in the prior art.

As shown in FIG. 16, the first tube 40 is an accordion tube formed from resin or metal. The straight insertion end 41 of the first tube 40 is formed by predetermined axial spans starting from the open end of the first tube 40. The axially inward section of the first tube 40 forms the accordion section 45. The insertion end 41 has a large-diameter end 42 at the outer end, and a small-diameter cylindrical section 43 disposed adjacent to and inward from the large-diameter end 42. The small-diameter cylindrical section 43 has a diameter that is smaller than the diameter of the large-diameter end 42. A shelf 44 sloped at approximately 45 degrees is formed at the boundary between the small-diameter cylindrical section 43 and the large-diameter end 42. The outer end of the large-diameter end 42 is projected radially outward in the form of a bent end 42a that has been bent radially outward and folded back horizontally.

As shown in FIG. 1, the second tube 47 is a resin or metal tube having a straight insertion end 48 that extends axially across a predetermined span from a first end of the second tube 47. The insertion end 48 is also formed with a ring-shaped projection 49 projected radially.

The connecting member 10 is formed from a hard resin such as a fiberglass-reinforced nylon resin or the like. As shown in FIGS. 2 through 10, the connecting member 10 includes a first cylindrical section 11 at a first axial end and a second cylindrical section 12 at a second axial end. The first and second cylindrical sections are integrally formed. The first cylindrical section 11 includes the following integrally formed elements: a cylindrically shaped joining cylinder 12; a ring-shaped flange 13 projected radially inward from the second end; and an inner cylinder 14 disposed axially within the joining cylinder 12 at a predetermined distance from the inner perimeter surface of the joining cylinder 12, extending from the flange 13 and projected toward the first end, parallel to the joining cylinder 12. All of the elements are formed with roughly the same thickness. Also, as shown in FIG. 1, an inner cylindrical member 15 is disposed as a separate element in the first cylindrical section 11. The inner and outer diameters of the inner cylindrical member 15 are the same as those of the inner cylinder 14. Within the joining cylinder 12, the second end of the inner cylindrical member 15 is axially separated from the first end of the inner cylinder 14 and is disposed co-axially with the joining cylinder 12, extending along the axis thereof and projecting slightly outward from the joining cylinder 12.

Figure 6:
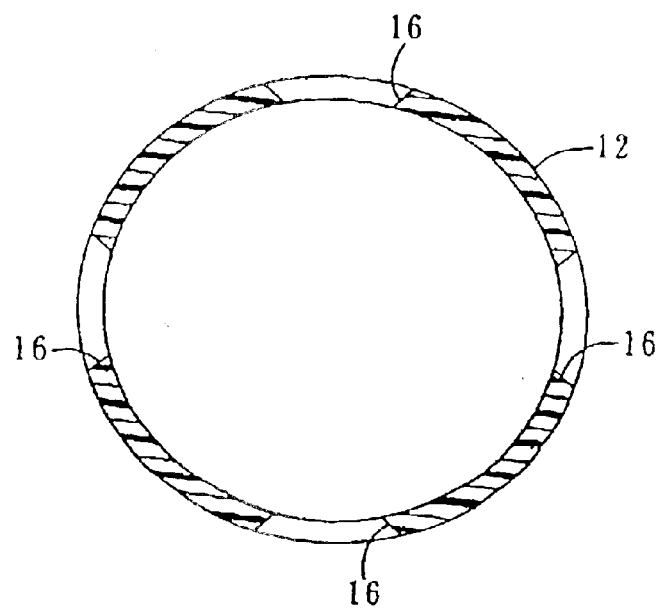
FIG. 6 is a cross-section drawing along the VI—VI line in FIG. 2 showing the connecting member.

Four rectangular slot-shaped engagement holes 16 are formed along the perimeter of the joining cylinder 12. The engagement holes 16 are separated equidistantly along the perimeter in the vicinity of the first end of the joining cylinder 12. Ribs 12a and 12b are formed, slightly projected co-axially, at or near the second end of the joining cylinder 12, along the entire perimeter of the outer perimeter surface. As shown in FIG. 6, the edges of the engagement holes 16 are sloped in a linear manner so that the holes become wider going from the inner perimeter side to the outer perimeter side. The inner cylinder 14 has an axial length that is approximately half that of the joining cylinder 12. A first end projecting from the inner cylindrical member 15 is formed as a sloped end 15a by a cut out shaped as a conical surface that tapers toward the end. The space between the inner perimeter surface of the joining cylinder 12 and the outer perimeter surfaces of the inner cylinder 14 and inner cylindrical member 15 is formed with a thickness that is roughly the same as that of the joining cylinder 12, inner cylinder 14, and inner cylindrical member 15, individually. This thickness is also roughly the same as the radial dimension of the bent end 42a of the first tube 40. Two O-rings 18, interposed by an elastic ring-shaped sealing member 19, are disposed co-axially in the axial space formed between the co-axially disposed inner cylinder 14 and inner cylindrical member 15.

As shown in FIGS. 11 through 15C, the joining member 30 is shaped cylindrically and is formed by combining two half-cylindrical members 31, which have symmetrical shapes and are formed from resin. Each half-cylindrical member 31 has a large-diameter section 32 at a second end and a small-diameter section 33 at a first end, with an axial midpoint serving as the boundary. The boundary between the large-diameter section 32 and the small-diameter section 33 is formed as a shelf 34 that is sloped at approximately 45 degrees. The inner diameters of the large-diameter section 32 and the small-diameter section 33 are roughly identical to the outer diameters of the large-diameter end 42 and the small-diameter cylindrical section 43 of the first tube 40, respectively. The thicknesses of the large-diameter section 32 and the small-diameter section 33 are slightly less than the space formed between the joining cylinder 12, and the inner cylinder 14 and inner cylindrical member 15 of the first cylindrical section 11.

A "C"-shaped groove 35a oriented in the axial direction is formed at a center position along the perimeter of the large-diameter section 32 of the half-cylindrical member 31. The "C"-shaped groove 35a is disposed at the axial center position. A rectangular engagement piece 35 partitioned by the "C"-shaped groove 35a is projected radially outward by being bent approximately 30 degrees at its base. Also, right angle grooves 36a are formed at positions axially aligned with each engagement piece 35 of the large-diameter section 32 and at ends along the outer perimeter surface. Each right angle groove 36a extends axially and then bends at a right angle toward the outer perimeter surface. A rectangular half-engagement piece 36 partitioned by the right angle groove 36a is projected radially outward by being bent at approximately 30 degrees at the base. The combined size of the paired half-engagement pieces 36 of the paired half-cylindrical members 31 is the same size as each engagement piece 35.

A ring-shaped rib 32a extending radially along the entire perimeter of the large-diameter section 32 is projected slightly outward from the outer perimeter surface near the shelf 34. The small-diameter section 33 is also formed with a ring-shaped rib 33a extending radially along the entire perimeter and projected slightly outward from the outer perimeter surface. Furthermore, engagement projections 37a, 37b, and 37c are projected perpendicularly from a first perimeter surface of the half-cylindrical member 31 (the surface toward the bottom of FIG. 13) and are aligned with the ring-shaped rib 32a of the large-diameter section 32, the shelf 34, and the ring-shaped rib 33a of the small-diameter section 33, respectively. Engagement cavities 38a, 38b, and 38c are formed on a second perimeter surface of the half-cylindrical member 31 (the surface toward the top of FIG. 13) and are aligned with the ring-shaped rib 32a of the large-diameter section 32, the shelf 34, and the ring-shaped rib 32a of the small-diameter section 33, respectively.

The large-diameter section 32 and the small-diameter section 33 of each half-cylindrical member 31 of the joining member 30 are aligned respectively with the large-diameter end 42 and the small-diameter cylindrical section 43 of the insertion end 41 of the first tube 40. The engagement projections 37a, 37b, and 37c are fitted to the associated engagement cavities 38a, 38b, and 38c, thus forming the joining member 30, which is fitted to the outer perimeter surface of the insertion end 41 of the first tube 40. As a result, the joining member 30 can grasp the first tube 40. The joining member 30, formed integrally with the insertion end 41 of the first tube 40 through grasping in this manner, can then be inserted and fitted into the space formed between the joining cylinder 12, and the inner cylinder 14 and inner cylindrical member 15. As a result, the joining member 30 and the insertion end 41 are both fitted into this space. Furthermore, the engagement pieces 35 and the half-engagement pieces 36 of the large-diameter section 32 are engaged with the engagement holes 16 of the joining cylinder 12 so that the joining member 30 is engaged with the joining cylinder 12 and the first tube 40 is tightly connected to the first cylindrical section 11 of the connecting member 10. The first tube 40 is thereby interposed between the inner perimeter surface of the joining member 30 and the outer perimeter surfaces of the inner cylinder 14 and inner cylindrical member 15. The shelf 34 of the joining member 30 and the shelf 44 of the first tube 40 are also aligned so as to block axial movement of the inner cylindrical member 15 toward the first end.

The second cylindrical section 21 has inner and outer diameters that are identical to the inner and outer diameters of the joining cylinder 12 of the first cylindrical section 11. The inner diameter of the second cylindrical section 21 is slightly larger than the outer diameter of the ring-shaped projection 49 of the second tube 47. The ring-shaped projection 49 can be inserted from an open end 21b at the second axial end. through an axial hole 21a. In the second cylindrical section 21, the second axial end is formed as an open cylindrical section 22. Two axially extending joining sections 23 are symmetrically disposed at positions along the perimeter between the open cylindrical section 22 and the first cylindrical section 11.

"C"-shaped cutouts are formed between the joining sections 23. These cutouts are horizontally long and are formed along the perimeter wall of the second cylindrical section 21, forming a pair of rotationally symmetrical slits 24. The slits 24 form a pair of engagement pieces 25 having arcuate cross-sectional shapes perpendicular to the axis. Seen from the second end in FIGS. 2 through 5, these engagement pieces 25 extend clockwise from one joining section 23 to a position near the other joining section 23, with the end of each engagement piece 25 being a free end. As a result, the elasticity of the resin material allows the free end of the engagement piece 25 to be elastically deformed radially outward in an arcuate manner from its base, which is secured to the joining section 23. A first end of the slit 24 forms a first slit 24a; a second end of the slit 24 forms a second slit 24b. The first slit 24a is wider than the second slit 24b and engages the ring-shaped projection 49 of the second tube 47. The perimeter end of the slit 24 forms a third slit 24c, which connects the first slit 24a and the second slit 24b.

Figure 5:
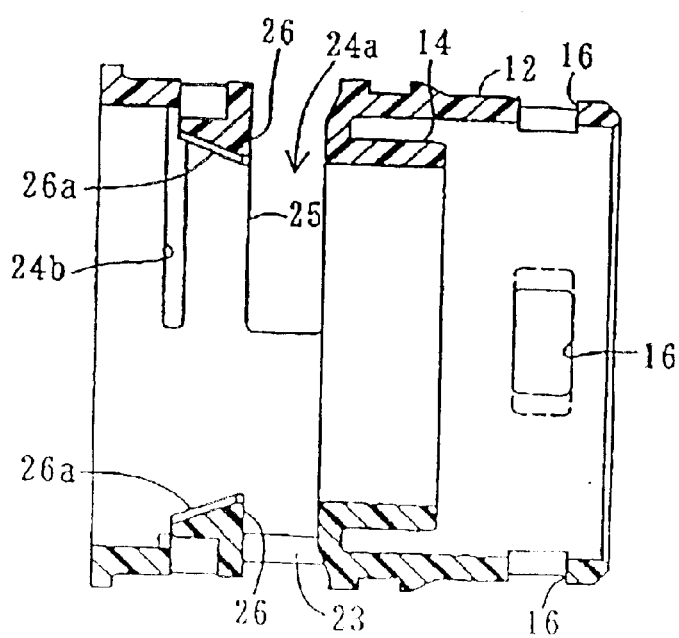
FIG. 5 is a cross-section drawing along the V—V line in FIG. 2 showing the connecting member.
Figure 7:
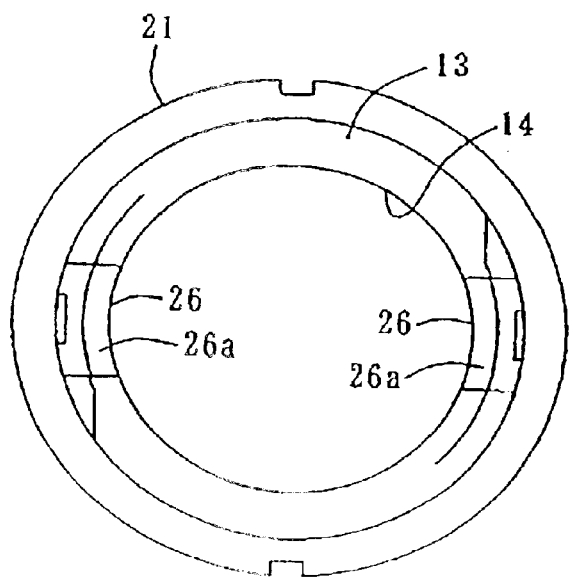
FIG. 7 is a left-side view drawing showing the connecting member.
Figure 8:
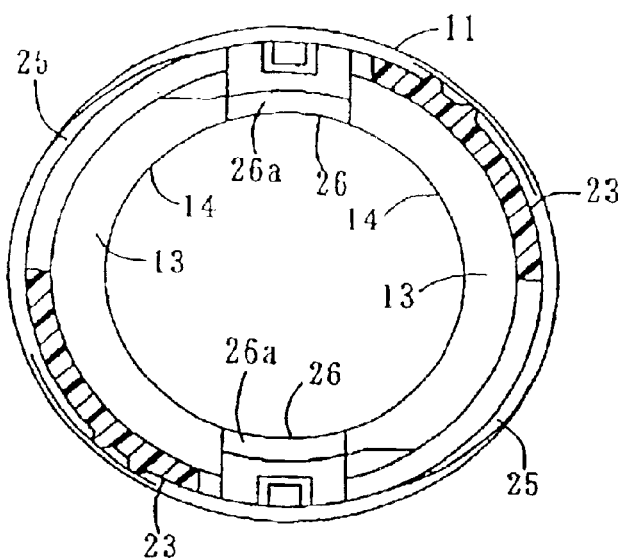
FIG. 8 is a cross-section drawing along the VIII—VIII line in FIG. 4 showing the connecting member.
Figure 9:
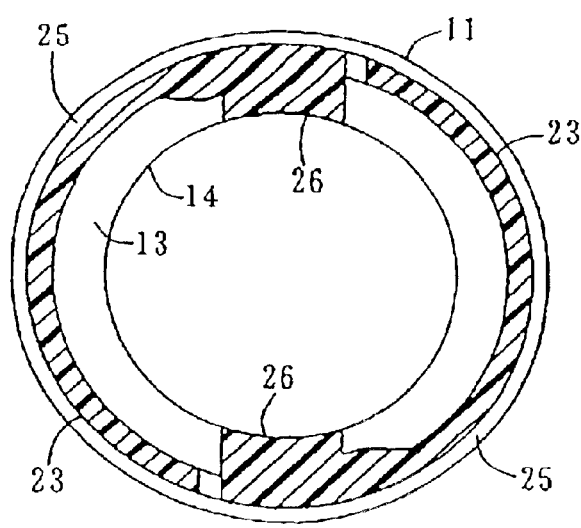
FIG. 9 is a cross-section drawing along the IX—IX line in FIG. 4 showing the connecting member.
Figure 10:
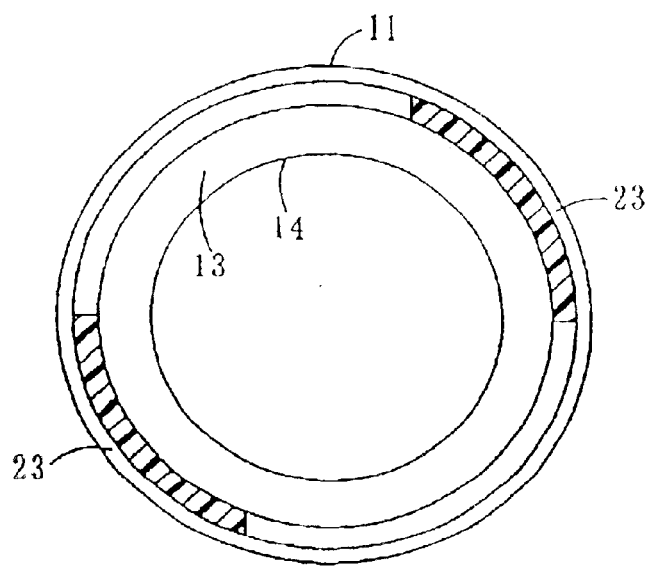
FIG. 10 is a cross-section drawing along the X—X line in FIG. 4 showing the connecting member.
Figure 11:
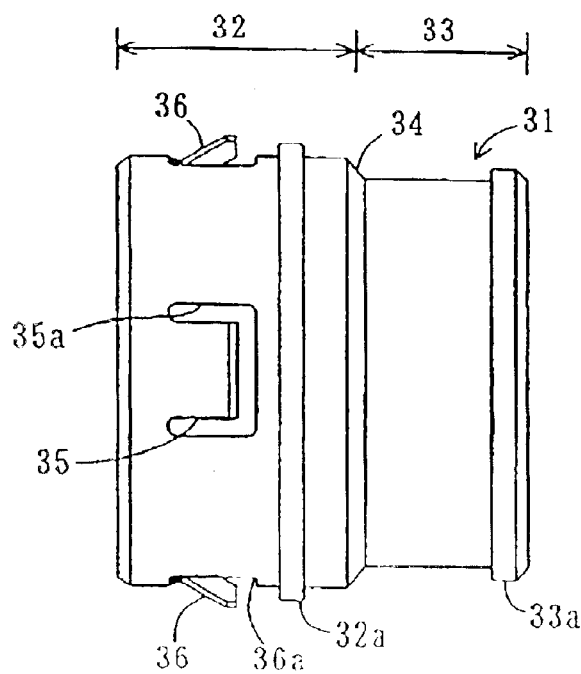
FIG. 11 is a front-view drawing showing a half-cylindrical member of the connecting member.
Figure 12:
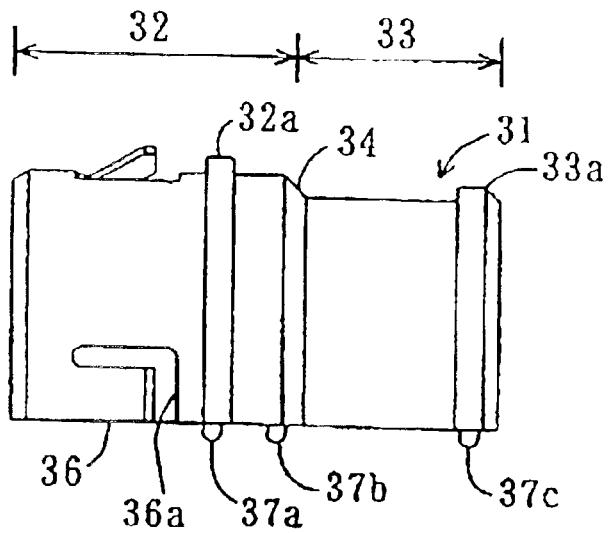
FIG. 12 is a bottom-view drawing showing the half-cylindrical member.
Figure 13:
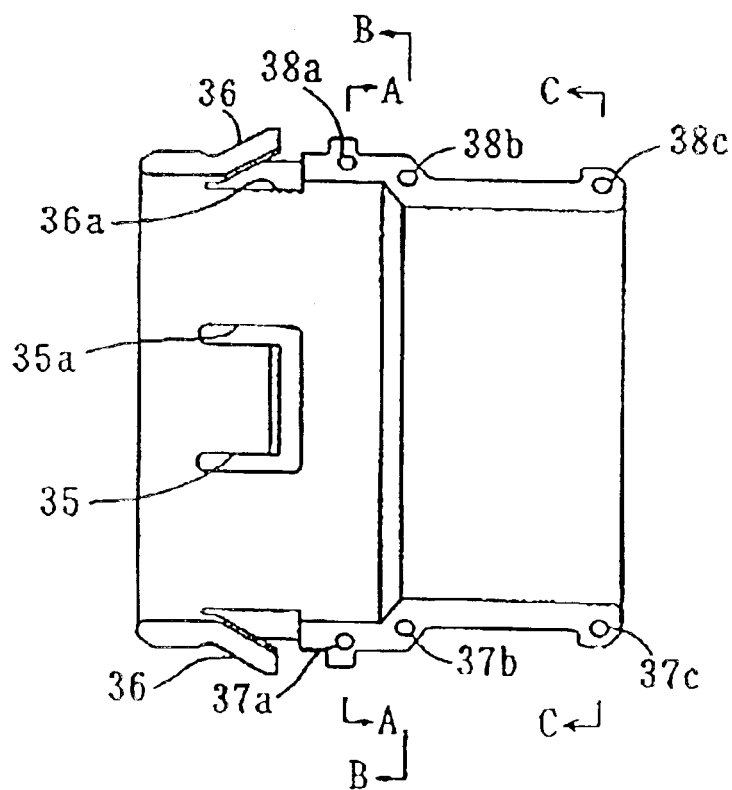
FIG. 13 is a rear-view drawing showing the half-cylindrical member.
Figure 14:
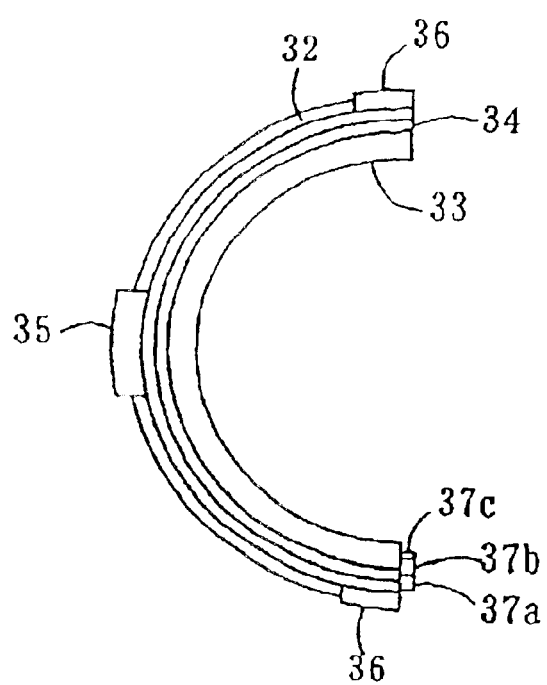
FIG. 14 is a left-side view drawing of FIG. 13 showing the half-cylindrical member.

The radially inward surfaces of the free ends of the engagement pieces 25 are formed with engagement projections 26 projecting radially inward. As shown in FIGS. 7 through 9, an inner surface 26a of the engagement projection 26 is formed in an arcuate shape along the perimeter. Also, as shown in FIG. 5, a linearly sloped surface is formed with a diminishing inner radius from the second axial end toward the first axial end. The inner diameter of the axial second end of the inner surface 26a is roughly the same as the outer diameter of the ring-shaped projection 49 of the second tube 47. The inner diameter of the first axial end is roughly the same as the outer diameter of the insertion end 48 of the second tube 47. As a result, when the second tube 47 is inserted into the second cylindrical section 21 from the open end 21b, the insertion end 48 passes the inner surface 26a of the engagement projection 26 smoothly, but the ring-shaped projection 49 will abut the inner surface 26a. The ring-shaped projection 49 moves along the slope of the inner surface 26a so that the engagement projection 26 receives radial pressure, causing the engagement piece 25 to be elastically deformed and pushed radially outward, passing the engagement projection 26. As a result, the state of engagement with the second tube 47 is released, the engagement piece 25 is restored, and the engagement projection 26 engages with the ring-shaped projection 49. The engagement of the engagement projection 26 with the ring-shaped projection 49 blocks the movement of the second tube 47 toward the second end.

When the second tube 47 is inserted into the second cylindrical section 21 in this manner, the insertion end 48 passes the engagement piece 25 and is inserted and fitted into the inner cylinder 14 of the first cylindrical section 11. As the second tube 47 is inserted further toward the first end, the ring-shaped projection 49 passes the engagement piece 25 and is engaged by the engagement projection 26, as described above, thus preventing the second tube 47 from slipping out of the second cylindrical section 21. The end of the insertion end 48 passes into the inner cylinder 14, passes the O-ring 18, and is inserted into the inner cylindrical member 15. Inside the first cylindrical section 11, the O-ring 18 forms a fluid-tight seal between the insertion end 48 and the first tube 40.

As described above, the first tube 40 is supported around the perimeter by the joining member 30 and is inserted and fitted into the first cylindrical section 11. As a result, the joining member 30 connects the first tube 40 inside of the first cylindrical section 11 and also serves to chuck the first tube 40. Thus, when the first tube 40 is inserted into the first cylindrical section 11, there is no need to provide a separate section at the end of the first tube 40 for chucking, and the length of the straight section at the end of the first tube 40 can be made relatively short. A tube such as the one in this embodiment, where the first tube 40 includes a flexible accordion section 45, can have a shortened, non-deformable straight section at the end. As a result, a tube connecting structure with an accordion section can be installed in a small, restricted space (e.g., in an automobile).

Also, the first tube 40 and the joining member 30 are together inserted and fitted integrally into the gap between the joining cylinder 12, and the inner cylinder 14 and inner cylindrical member 15. A shelf 44 is formed between the large-diameter end 42 and the small diameter cylindrical section 43 of the first tube 40. This shelf 44 engages tightly with the shelf 34 at the boundary between the large-diameter section 32 and the small-diameter section 33 of the joining member 30. As a result, the first tube 40 is reliably prevented from slipping out of the first cylindrical section 11 without having to rely on tension with the inner cylinder 14 and inner cylindrical member 15. Thus, even if the tension on the first tube 40 decreases, the first tube 40 is reliably prevented from slipping out of the first cylindrical section 11. Consequently, the material used to form the first tube 40 does not need to be an elastic material such as resin or rubber and can be a metallic material instead.

Furthermore, because the inner cylindrical member 15 engages with the shelf 44 of the first tube 40 such that the inner cylindrical member 15 is prevented from moving toward the first axial end, the O-ring 18, which is supported by the second axial end of the inner cylindrical member 15, is also prevented from slipping out of the first cylindrical section 11. The O-rings 18 create a fluid-tight seal between the inner perimeter surface of the large-diameter end 42 of the first tube 40 and the outer perimeter surface of the insertion end 48 of the second tube 47. As a result, the connecting member 10 provides a tight seal between the first tube 40 and the second tube 47.

In the connecting member 10 described above, the second cylindrical section 21 is integrally formed with the engagement piece 25. The engagement piece 25 serves as an engaging means to allow insertion of the second tube 47 into the second cylindrical section 21 and to prevent the second tube 47 from slipping out. However, the structure of the engaging means is not restricted to engagement piece 25. In an alternative embodiment, an engaging member can be mounted separately from the second cylindrical section. Also, the first tube does not have to be an accordion tube as described above and can be a straight tube. Other aspects of the tube connecting structure described in the above embodiments are presented as examples, and various alternate implementations may be effected within the spirit of the present invention.

In the present invention, a first tube is supported by a joining member formed from a pair of half-cylindrical members. As a result, the first tube can be connected to the first cylindrical section via the joining member, and the joining member can serve as a chuck when the first tube is fitted and inserted into the first cylindrical section. Thus, according to the present invention, there is no need to provide a separate straight section at the end of the first tube to serve as a chuck. This makes it possible to make the straight section at the end of the first tube shorter. As a result, the first tube can, for example, be an accordion tube with a short non-deformable straight section at the end. Thus, installation of the tube connecting structure of the present invention is not restricted by small spaces (e.g., spaces in an automobile).

Also, according to the present invention, the first tube is reliably prevented from slipping out of the first cylindrical section without relying on tension on the inner cylinder and inner cylindrical member. As a result, even if the tension on the first tube is reduced, the present invention reliably prevents the first tube from slipping out. Additionally, since the first tube does not require tension to prevent slippage, the first tube does not need to be formed from an elastic material and can be formed from a metallic material instead. According to the present invention, the shelves of the joining member and the first tube serve to prevent the inner cylindrical member from moving outward along the axis of the first cylindrical section. The elastic ring-shaped sealing member is reliably prevented from slipping out of the first cylindrical section by the shelf of the first tube, which prevents the inner cylindrical member from slipping out of the first cylindrical section. As a result, a reliable seal is provided between the first tube and the second tube of the tube connecting structure.

Furthermore, in the present invention, the inner perimeter surface of the large-diameter section of the first tube is pressed against the elastic ring-shaped sealing member. In the second tube, the insertion end extends to the inner cylindrical member in the first cylindrical section and is also pressed against the elastic ring-shaped sealing member. Thus, the elastic ring-shaped sealing member maintains a tight seal between the first tube and the second tube.

I claim:

1. A tube connecting structure having an integrally formed cylindrical connecting member comprising:
   a first cylindrical section disposed at a first axial end;
      wherein said first cylindrical section comprises:
      a joining cylinder having a first end and a second end;
      said joining cylinder formed with engagement holes at a first end at a plurality of perimeter positions;
      a ring-shaped flange projected radially inward from said second end of said joining cylinder;
      an inner cylinder extending within said joining cylinder co-axially from said ring-shaped flange toward said first end of said joining cylinder and separated by a predetermined distance from said first end of said joining cylinder;
      an inner cylindrical member having a diameter identical to that of said inner cylinder and extending co-axially within said joining cylinder at a predetermined distance from a first end of said inner cylinder, one end being projected outward from said first end of said joining cylinder; and
      an elastic ring-shaped sealing member disposed co-axially between said inner cylinder and said inner cylindrical member;
   a second cylindrical section co-axially disposed at a second axial end;
   a first tube being connected to said first cylindrical section;
      wherein said first tube comprises:
      a large-diameter end spanning axially from one end to a predetermined distance;
      said large-diameter end having an inner diameter roughly identical to an outer diameter of said inner cylinder and said inner cylindrical member; and
      a small-diameter cylindrical section adjacent to said large-diameter end;
      said small-diameter cylindrical section having a diameter smaller than that of said large-diameter end;
   a second tube being connected to said second cylindrical section;
      said second tube comprising an insertion end extending in a straight manner and being formed with a ring-shaped projection projecting radially outward at a predetermined distance from an end;
      said second tube being inserted into said second cylindrical section so that said ring-shaped projection engages with an engaging means formed integrally or separately from said second cylindrical section; and
      an end of said insertion end extending to said inner cylindrical member in said first cylindrical section;
   a joining member formed as a cylindrical shape from a pair of half-cylindrical members;
      each said half-cylindrical member having a second axial end formed as a large-diameter section and a first axial end formed as a small-diameter section;
      engagement pieces being formed on said large-diameter section at positions aligned with said engagement holes on said joining cylinder;
      said engagement pieces being projected radially outward and being elastically deformable in a radial direction;
      said joining member supporting said first tube by placing said large-diameter end at said large-diameter section and placing said small-diameter section at said small-diameter cylindrical section;
      said joining member being inserted and integrally fitted with said first tube into a space formed between said joining cylindrical structure, said inner cylinder and said inner cylindrical member; and
      said engagement pieces of said large-diameter section engaging with said engagement holes so that said first tube is connected with said first cylindrical section; and
   said elastic ring-shaped sealing member forming a fluid-tight seal between an inner perimeter surface of said large-diameter end of said first tube and an outer perimeter surface of an insertion end of said second tube.

2. A tube connecting structure having an integrally formed cylindrical connecting member comprising:

a first cylindrical section disposed at a first axial end;

a second cylindrical section disposed at a second axial end;

a first tube being connected to said first cylindrical section;

said first tube having a large-diameter end and a small-diameter cylindrical section;

a second tube being connected to said second cylindrical section;

said second tube having an insertion end;

a joining member formed as a cylindrical shape from a pair of half-cylindrical members; and an elastic ring-shaped sealing member forming a fluid-tight seal between an inner perimeter surface of said large-diameter end of said first tube and an outer perimeter surface of an insertion end of said second tube;

wherein said first cylindrical section further comprises:

a joining cylinder having a first end and a second end;

said joining cylinder formed with engagement holes at a first end at a plurality of perimeter positions;

a ring-shaped flange projected radially inward from said second end of said joining cylinder;

an inner cylinder extending within said joining cylinder co-axially from said ring-shaped flange toward said first end of said joining cylinder and separated by a predetermined axial distance from said first end of said joining cylinder;

an inner cylindrical member having a diameter identical to that of said inner cylinder and extending co-axially within said joining cylinder at a predetermined distance from a first end of said inner cylinder, one end of said inner cylindrical member being projected outward from said first end of said joining cylinder; and an elastic ring-shaped sealing member disposed co-axially between said inner cylinder and said inner cylindrical member.

3. A tube connecting structure having an integrally formed cylindrical connecting member comprising:

a first cylindrical section disposed at a first axial end;

a second cylindrical section disposed at a second axial end;

a first tube being connected to said first cylindrical section;

said first tube having a large-diameter end and a small-diameter cylindrical section;

a second tube being connected to said second cylindrical section;

said second tube having an insertion end;

a joining member formed as a cylindrical shape from a pair of half-cylindrical members; and an elastic ring-shaped sealing member forming a fluid-tight seal between an inner perimeter surface of said large-diameter end of said first tube and an outer perimeter surface of an insertion end of said second tube;

wherein said first tube further comprises:

a large-diameter end;

said large-diameter end having an inner diameter roughly identical to an outer diameter of each of said inner cylinder and said inner cylindrical member;

a small-diameter cylindrical section adjacent to said large-diameter end; and said small-diameter cylindrical section having a diameter smaller than that of said large-diameter end.

4. A tube connecting structure having an integrally formed cylindrical connecting member comprising:

a first cylindrical section disposed at a first axial end;

a second cylindrical section disposed at a second axial end;

a first tube being connected to said first cylindrical section;

said first tube having a large-diameter end and a small-diameter cylindrical section;

a second tube being connected to said second cylindrical section;

said second tube having an insertion end;

a joining member formed as a cylindrical shape from a pair of half-cylindrical members; and an elastic ring-shaped sealing member forming a fluid-tight seal between an inner perimeter surface of said large-diameter end of said first tube and an outer perimeter surface of an insertion end of said second tube;

wherein said second tube further comprises:

an insertion end extending in a straight manner and being formed with a ring-shaped projection projecting radially outward at a predetermined distance from an end;

said second tube being inserted into said second cylindrical section so that said ring-shaped projection engages with an engaging means formed integrally or separately from said second cylindrical section; and an end of said insertion end extending to said inner cylindrical member in said first cylindrical section.

5. A tube connecting structure having an integrally formed cylindrical connecting member comprising:

a first cylindrical section disposed at a first axial end;

a second cylindrical section disposed at a second axial end;

a first tube being connected to said first cylindrical section;

said first tube having a large-diameter end and a small-diameter cylindrical section;

a second tube being connected to said second cylindrical section;

said second tube having an insertion end;

a joining member formed as a cylindrical shape from a pair of half-cylindrical members; and an elastic ring-shaped sealing member forming a fluid-tight seal between an inner perimeter surface of said large-diameter end of said first tube and an outer perimeter surface of an insertion end of said second tube;

wherein said joining member further comprises:

each half-cylindrical member having a second axial side formed as a large-diameter section and a first axial side formed as a small-diameter section;

engagement pieces being formed on said large-diameter section at positions aligned with said engagement holes on said joining cylinder;

said engagement pieces being projected radially outward and being elastically deformable in a radial direction;

said joining member supporting said first tube by placing said large-diameter end at said large-diameter section and placing said small-diameter section at said small-diameter cylindrical section;

said joining member being inserted and integrally fitted with said first tube into a space formed between said joining cylindrical structure, said inner cylinder and said inner cylindrical member; and said engagement pieces of said large-diameter section engaging with said engagement holes so that said first tube is connected with said first cylindrical section.

6. A tube connecting structure according to claim 1 wherein said first tube is formed from resin or metal.

7. A tube connecting structure according to claim 1 wherein said second tube is formed from resin or metal.

8. A method of connecting a first tube to a second tube comprising the steps of:

fitting a large-diameter section of a joining member to a large-diameter end of a first tube;

fitting a small-diameter section of said joining member to a small-diameter cylindrical section of said first tube;

inserting said joining member and said first tube into a first cylindrical section disposed at a first axial end of a connecting member;

pressing said large-diameter end of said first tube against an elastic ring-shaped sealing member of said connecting member;

inserting an insertion end of a second tube into a second cylindrical section disposed at a second axial end of said connecting member;

pressing an inner perimeter surface of said large-diameter end of said first tube against a pair of O-rings co-axially disposed in said connecting member;

pressing an outer perimeter surface of said insertion end of said second tube against said pair of O-rings in said connecting member; and creating a fluid-tight seal between said first tube and said second tube.

* * * * *